United States Patent
Nishita et al.

(10) Patent No.: US 10,697,771 B2
(45) Date of Patent: Jun. 30, 2020

(54) SURVEY SYSTEM

(71) Applicant: TOPCON CORPORATION, Itabashi-Ku, Tokyo (JP)

(72) Inventors: Nobuyuki Nishita, Tokyo (JP); Kazuki Osaragi, Tokyo (JP); Yasuhito Haijima, Tokyo (JP); You Sasaki, Tokyo (JP); Hiroyuki Ikegami, Tokyo (JP)

(73) Assignee: TOPCON CORPORATION, Itabashi-ku, Tokyo (JP)

( * ) Notice: Subject to any disclaimer, the term of this patent is extended or adjusted under 35 U.S.C. 154(b) by 0 days.

(21) Appl. No.: 15/890,617

(22) Filed: Feb. 7, 2018

(65) Prior Publication Data
US 2018/0224276 A1 Aug. 9, 2018

(30) Foreign Application Priority Data
Feb. 9, 2017 (JP) .................. 2017-022471

(51) Int. Cl.
*G01C 11/02* (2006.01)
*G06K 9/00* (2006.01)
(Continued)

(52) U.S. Cl.
CPC ............ *G01C 11/025* (2013.01); *G01C 11/02* (2013.01); *G06K 9/0063* (2013.01); *H04N 7/185* (2013.01); *G06K 2009/3291* (2013.01)

(58) Field of Classification Search
CPC .. G05D 1/0094; G08G 5/0069; G08G 5/0073; B64C 39/024; B64C 2201/127;
(Continued)

(56) References Cited

U.S. PATENT DOCUMENTS 5,293,191 A 3/1994 Umetsu
5,671,160 A * 9/1997 Julian ................... B64C 39/024
(Continued)

FOREIGN PATENT DOCUMENTS

JP 2015-145784 A 8/2015

OTHER PUBLICATIONS

Final Office Action dated Nov. 13, 2019, in connection with U.S. Appl. No. 15/890,635, filed Feb. 7, 2018, 22 pgs.

*Primary Examiner* — Nathnael Aynalem
(74) *Attorney, Agent, or Firm* — Chiesa Shahinian & Giantomasi PC

(57) ABSTRACT

A survey system including a movable photographing device, a surveying device, and an analysis device. The movable photographing device includes a camera mounted on a UAV and taking a plurality of images P for photogrammetry, and a GPS unit including a first time stamping portion stamping a first time Tc relating to a photographing time on the image P taken. The surveying device determines a position of the movable photographing device, and includes a second time stamping portion stamping a second time Tt relating to a surveying time on a survey result R determined above. The analysis device includes a photographing position analysis portion associating each survey result R with a photographing position of the respective image P based on the first time Tc and the second time Tt, and generating data for photogrammetry.

3 Claims, 5 Drawing Sheets

(51) Int. Cl.
*H04N 7/18* (2006.01)
*G06K 9/32* (2006.01)

(58) Field of Classification Search
CPC ........ B64C 2201/123; B64C 2201/146; B64C 2201/024; B64C 2201/141; B64C 2201/145; B64C 2201/027; B64C 2201/108; B64C 2201/14; B64D 45/00; G06T 2207/10032; G06T 2207/30181; G03B 15/006; G03B 35/02; H04N 13/221
USPC .......................... 348/50, 135, 142–144, 149
See application file for complete search history.

(56) References Cited

U.S. PATENT DOCUMENTS

| | | |
|---|---|---|
| 9,201,422 B2 | 12/2015 | Ohtomo et al. |
| 9,409,656 B2 | 8/2016 | Ohtomo et al. |
| 9,609,282 B2 | 3/2017 | Ohtomo et al. |
| 9,773,420 B2 | 9/2017 | Ohtomo et al. |
| 10,234,287 B2 | 3/2019 | Siercks et al. |
| 2003/0133018 A1 | 7/2003 | Ziemkowski |
| 2003/0160757 A1* | 8/2003 | Shirai ...................... G01C 1/04 345/156 |
| 2014/0055613 A1 | 2/2014 | Ohtomo et al. |
| 2014/0240498 A1* | 2/2014 | Ohtomo .................. H04N 7/18 348/144 |
| 2014/0371952 A1* | 12/2014 | Ohtomo et al. ....... G01C 15/00 33/293 |
| 2015/0220085 A1 | 8/2015 | Ohtomo et al. |
| 2016/0049081 A1 | 2/2016 | Ohtomo et al. |
| 2017/0336203 A1* | 11/2017 | Barnes et al. ......... B64D 47/08 348/144 |
| 2017/0355458 A1* | 12/2017 | Chen et al. ............. G01S 17/88 |
| 2018/0109767 A1* | 4/2018 | Li ...................... H04N 5/23206 |

* cited by examiner

SURVEY SYSTEM

CROSS-REFERENCE TO RELATED APPLICATION

This application claims priority to Japanese Patent Application No. 2017-022471 filed on Feb. 9, 2017, the entire disclosure of which is incorporated by reference herein.

BACKGROUND

The present disclosure relates to a photogrammetry system that includes a movable photographing device taking images for photogrammetry and a surveying device determining a position of the movable photographing device.

In typically known stereophotogrammetry, a movable body includes a camera, which takes images (static images and dynamic images) from two or more different positions, the images being used for a survey.

In particular, in recent photogrammetry, a UAV (Unmanned Air Vehicle) is used as a movable body including a camera, which takes images from the sky.

In such photogrammetry, it has been necessary to take an image so that a plurality of control points are photographed in the image, in order to associate the image with a ground point. As such, the photographing operation has been limited. It has been also necessary to take effort to set air marks indicative of the control points in a target survey area in advance so that the control points are clearly photographed in the image taken.

To address this problem, Japanese Unexamined Patent Publication No. 2015-145784 discloses photogrammetry where positional information of a UAV is obtained from a GPS and a total station (a position measurement device) to take images for photogrammetry at positions predetermined in a flight plan. As such, the GPS and the total station are used to identify the photographing positions so that the number of control points required in the image can be reduced, or the step of associating the control points can be omitted.

SUMMARY OF THE EMBODIMENTS

However, in the photogrammetry of Japanese Unexamined Patent Publication No. 2015-145784, the position, determined by the GPS, of the UAV during a photographing operation is less accurate than the position, determined by the total station, of the UAV.

On the contrary, when the position of the UAV is determined by the total station, the total station is away from the camera of the UAV during a photographing operation. Thus, the total station cannot recognize the time when the camera of the UAV conducts an actual photographing operation. Then, a time difference occurs between the photographing time and the surveying time so that the photographing position is identified less accurately.

In view of the foregoing, it is an object of the present disclosure to provide a survey system capable of precisely associating a photographing time of an image taken by a movable photographing device including a movable body (such as a UAV) and a camera with a surveying time obtained by a surveying device such as a total station, to accurately identify a photographing position to improve the accuracy of photogrammetry.

To achieve the object, the survey system of an embodiment of the present disclosure includes a movable photographing device including a movable body, a photographing portion taking a plurality of images for photogrammetry, and a first time stamping portion stamping a first time relating to a photographing time on the images taken by the photographing portion; a surveying device including a surveying portion determining a position of the movable photographing device, and a second time stamping portion stamping a second time relating to a surveying time on a survey result obtained by the surveying portion; and a photographing position analysis portion associating, based on the first time and the second time, a survey result obtained by the surveying device with a photographing position of each image taken by the movable photographing device, and generating data for photogrammetry.

An embodiment of the present disclosure containing the above configuration can provide associating a photographing time of an image taken by a movable photographing device including a movable body and a camera with a surveying time obtained by a surveying device, to accurately identify a photographing position to improve the accuracy of photogrammetry.

DETAILED DESCRIPTION

Embodiments of the present disclosure will be described below with reference to the drawings.

Figure 1:
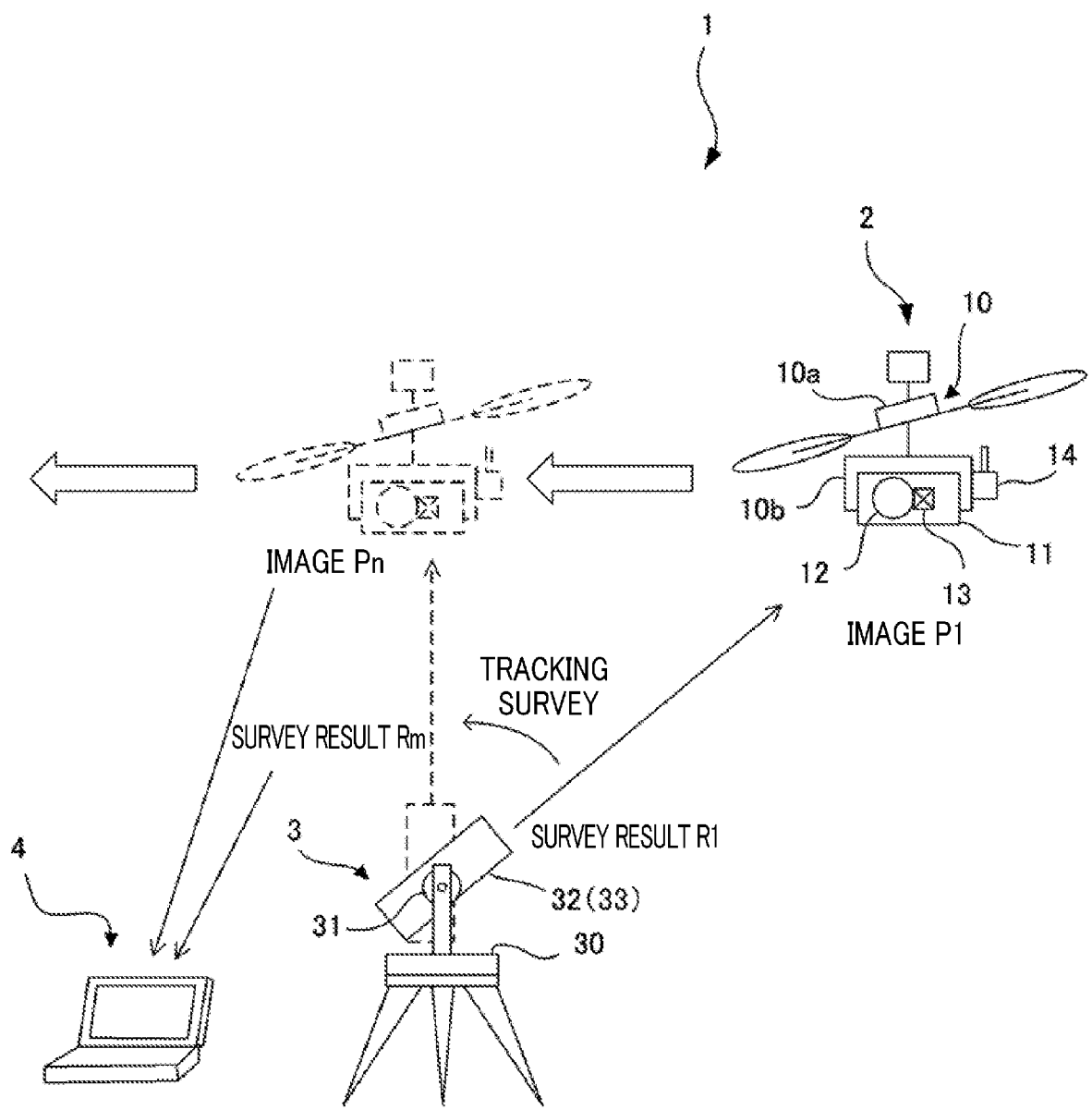
FIG. 1 is an overall configuration diagram of a survey system of one embodiment of the present disclosure.
Figure 2:
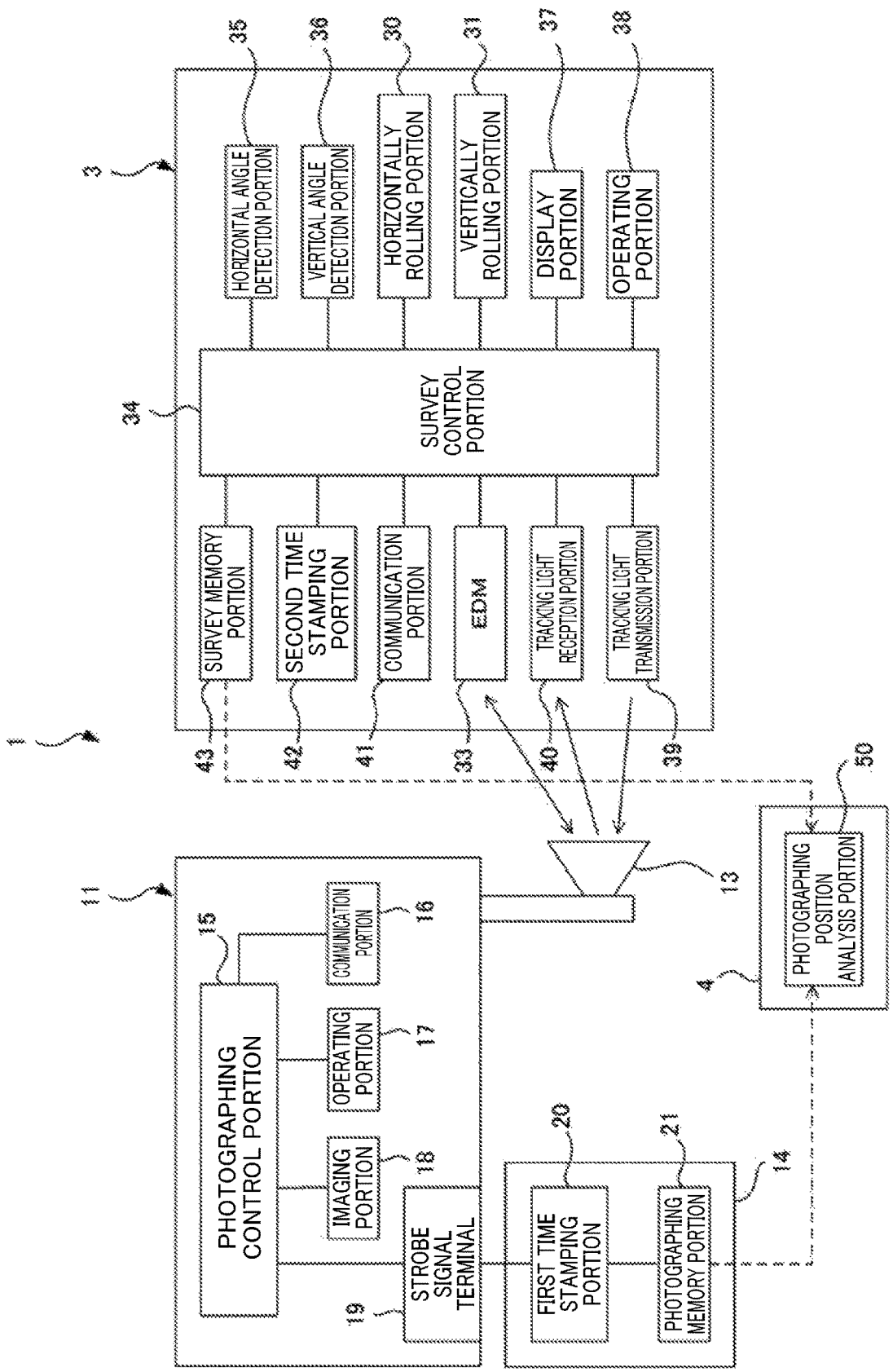
FIG. 2 is a control block diagram of the survey system of one embodiment of the present disclosure.

FIG. 1 is an overall configuration diagram of a survey system 1 of one embodiment of the present disclosure. FIG. 2 is a control block diagram of the survey system 1. The overall configuration and control system of the survey system 1 of the embodiment of the present disclosure will be described with reference to FIGS. 1 and 2.

The survey system 1 is a survey system for photogrammetry. The survey system 1 includes a movable photographing device 2 moving to take a plurality of images for photogrammetry, a surveying device 3 determining a position of the movable photographing device 2, and an analysis device 4 analyzing a photographing result and a surveying result and generating data for photogrammetry.

The movable photographing device 2 is composed of a UAV 10, which is a movable body. The UAV 10 includes a camera 11 (a photographing portion) taking images for photogrammetry. Note that the image taken by the camera 11 may be a static image or a dynamic image.

Specifically, the UAV 10 is a flight movable body capable of flying through a predetermined flight path and freely flying by remote control. The UAV 10 includes a flight mechanism 10a for flight and a gimbal mechanism 10b provided below the flight mechanism 10a.

The camera 11 is supported by the gimbal mechanism 10b of the UAV 10. The gimbal mechanism 10b enables the camera 11 to take images in any direction, and allows the camera 11 to have a stabilized attitude to take images in a fixed direction.

The camera 11 has a body having a front surface provided with a lens portion 12. The lens portion 12 has a front end beside which a prism 13 is provided. The camera 11 is also provided with a GPS unit 14 capable of receiving a GPS signal.

The surveying device 3 is a total station capable of automatically tracking a survey object. The surveying device 3 includes a horizontally rolling portion 30 capable of rolling in a horizontal direction, a vertically rolling portion 31 capable of rolling in a vertical direction, and a telescope portion 32 provided on the horizontally rolling portion 30 through the vertically rolling portion 31. The telescope portion 32 is also provided with an electro-optical distance meter (EDM) 33 (a surveying portion) measuring a slant distance to a target.

Specifically, the surveying device 3 can perform prism survey for surveying the prism 13. That is, the surveying device 3 can measure a distance from the surveying device 3 to the prism 13, and also can measure a horizontal angle and a vertical angle formed by the surveying device 3 and the prism 13. Thus, the surveying device 3 arranged in a predetermined position and having an attitude in a leveled manner can survey the prism 13 to calculate coordinates of the prism 13, i.e., a position of the camera 11, based on the survey results (the slant distance, the horizontal angle, and the vertical angle).

The analysis device 4 is an information processing terminal such as a personal computer capable of associating a survey result obtained from the surveying device 3 with a photographing position where each image has been taken by the movable photographing device 2, and generating data for photogrammetry.

In the survey system 1, as illustrated in FIG. 1, the movable photographing device 2 moves in the sky to take a plurality of images P1, P2, . . . , Pn for photogrammetry by a predetermined photographing period ΔS. Then, the surveying device 3 tracks and surveys the movable photographing device 2 (strictly, the prism 13) to conduct a survey. Then, the analysis device 4 associates the images P1, P2, . . . , Pn taken by the movable photographing device 2 with survey results R1, R2, . . . , Rm obtained by the surveying device 3, and then generates data for photogrammetry.

Next, referring to FIG. 2, the configuration of the control system based on the camera 11, the surveying device 3, and the computer of the analysis device 4, of the survey system 1, will be described.

As illustrated in FIG. 2, the camera 11 includes a photographing control portion 15. The photographing control portion 15 is electrically connected with a communication portion 16, an operating portion 17, an imaging portion 18, and a strobe signal terminal 19. Note that, although not shown, the photographing control portion 15 may also be connected with a memory portion, a display portion, etc., and may be connected with a sensor etc. At least images taken are stored in an internal or external memory portion.

The communication portion 16 can communicate with exterior equipment. The communication portion 16 is, e.g., a wireless communication means such as a Bluetooth (a registered trademark). Note that, the communication portion 16 may include a wired communication means though a connecting terminal. This also applies to the following communication portion.

The operating portion 17 is a control means for inputting various operational instructions or settings to the photographing control portion 15. Examples of the operational instructions include instructions for turning on or off a power supply, triggering a photographing operation, switching a photographing mode, setting a photographing period, setting an image quality, and turning on or off a connection with the surveying device 3. The operating portion 17 may also include any operating or input devices such as switches, buttons, and dials.

The imaging portion 18 performs a photographing operation. The imaging portion 18 includes an imaging device (such as a CCD and a CMOS device) converting an optical image into electrical signals, and a shutter.

The strobe signal terminal 19 is, e.g., a hot shoe or a synchro terminal for a strobe. The strobe signal terminal 19 is a connecting terminal capable of communicating a shutter signal to external equipment.

The photographing control portion 15 can control the imaging portion 18 so that the imaging portion 18 performs a photographing operation by a predetermined photographing period ΔS. The photographing control portion 15 can also make the strobe signal terminal 19 convey a shutter signal or a taken image to external equipment.

The GPS unit 14 is connected with the camera 11 through the strobe signal terminal 19. The GPS unit 14 includes a first time stamping portion 20 and a photographing memory portion 21.

The first time stamping portion 20 receives a GPS signal containing time information from a GPS satellite. The first time stamping portion 20 includes a clock. The clock generates a GPS time based on the GPS signal. The clock generates a PPS signal which is a periodic pulse. In response to the shutter signal conveyed through the strobe signal terminal 19, the first time stamping portion 20 stamps a first time Tc (a GPS time) relating to a photographing time on an image P taken by the camera 11, and outputs the image P to the photographing memory portion 21. Note that the GPS time is, e.g., an absolute time based on Coordinated Universal Time (UTC).

The photographing memory portion 21 can store the image data containing the first time Tc that the first time stamping portion 20 stamped on the image P taken by the camera 11.

The surveying device 3 includes a survey control portion 34 connected with the horizontally rolling portion 30, the vertically rolling portion 31, and the EDM 33. The survey control portion 34 is also connected with a horizontal angle detection portion 35 (a surveying portion), a vertical angle detection portion 36 (a surveying portion), a display portion 37, an operating portion 38, a tracking light transmission portion 39, a tracking light reception portion 40, a communication portion 41, a second time stamping portion 42, and a survey memory portion 43.

The horizontal angle detection portion 35 detects a rolling angle of the horizontally rolling portion 30 in the horizontal direction to detect a horizontal angle collimated by the telescope portion 32. The vertical angle detection portion 36 detects a rolling angle of the vertically rolling portion 31 in the vertical direction to detect a vertical angle collimated by the telescope portion 32. From the horizontal angle detection portion 35 and the vertical angle detection portion 36, a horizontal angle and a vertical angle as survey results are detected.

The display portion 37 is, e.g., a liquid crystal monitor. The display portion 37 can display various pieces of information such as the survey results (the slant distance, the horizontal angle, the vertical angle).

The operating portion 38 is a control means for inputting various operational instructions or settings to the survey control portion 34. Examples of the operational instructions include instructions for turning on or off a power supply, triggering a survey, switching a survey mode, and setting a surveying period. Similarly to the operating portion of the camera 11, the operating portion 38 may include any operating or input devices such as switches, buttons, and dials.

The tracking light transmission portion 39 emits track light. The tracking light reception portion 40 receives the tracking light reflected by the prism 13. The survey control portion 34 controls the horizontally rolling portion 30 and the vertically rolling portion 31 to enable the tracking light reception portion 40 to keep receiving the tracking light from the tracking light transmission portion 39. As such, the function of tracking a target is achieved.

Similarly to the communication portion 16 of the camera 11, the communication portion 41 can communicate with exterior equipment. The communication portion 41 is, e.g., a wireless communication means such as a Bluetooth.

Similarly to the first time stamping portion 20, the second time stamping portion 42 receives a GPS signal containing time information from a GPS satellite. The first time stamping portion 20 includes a clock. The clock generates a GPS time based on the GPS signal. The clock generates a PPS signal which is a periodic pulse. In response to conduction of a survey, the second time stamping portion 42 stamps a second time Tt (a GPS time) relating to a surveying time on a survey result R, and outputs the survey result R to the survey memory portion 43.

The survey memory portion 43 can store a program for the above-described tracking function; various programs for survey (e.g., a program for conducting a survey by a predetermined surveying period); and various pieces of data (e.g., survey data containing the second time Tt stamped on the survey result R by the second time stamping portion 42).

The survey control portion 34 starts a survey by a predetermined surveying period $\Delta T$ when tracking of the prism 13 starts. Then, the survey memory portion 43 stores the survey data containing the second time Tt stamped on the survey result R by the second time stamping portion 42.

The analysis device 4 includes a photographing position analysis portion 50. The photographing position analysis portion 50 can be connected in a wired or wireless manner with the movable photographing device 2 and the surveying device 3. The photographing position analysis portion 50 obtains each image data containing the image P on which the first time Tc was stamped and which is stored in the photographing memory portion 21 of the movable photographing device 2. The photographing position analysis portion 50 also obtains the survey data containing the survey result R on which the second time Tt was stamped and which is stored in the survey memory portion 43 of the surveying device 3. Then, the photographing position analysis portion 50 associates the image date with the survey data based on the first time Tc and the second time Tt to generate the data for photogrammetry.

Figure 3:
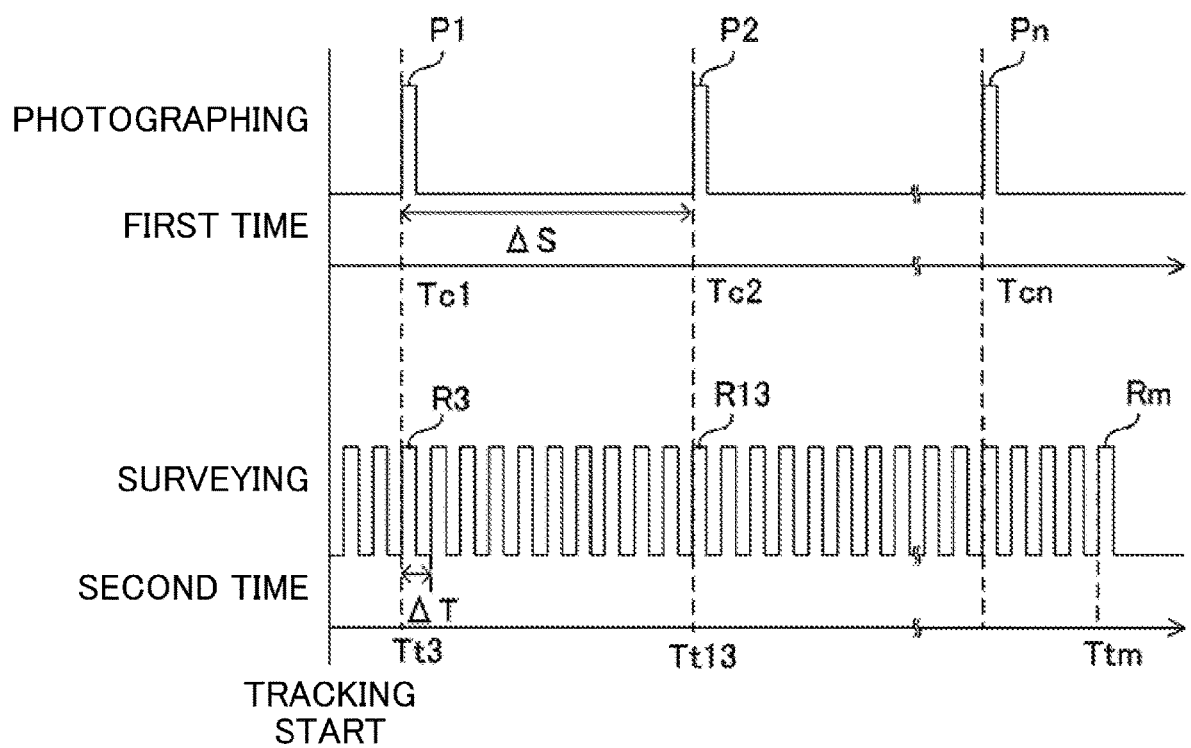
FIG. 3 is a time chart of photographing and surveying conducted by the survey system of this embodiment of the present disclosure.

Here, FIG. 3 is a time chart of photographing and surveying conducted by the survey system of this embodiment. A methodology of generation of the data for photogrammetry of the survey system will be described below with reference to FIG. 3.

The movable photographing device 2 flies along a flight plan, and conducts photographing operations a plurality of times (n times) through the camera 11 by a predetermined photographing period $\Delta S$. When the photographing operations are performed through the camera 11, in response to the shutter signal, the first time stamping portion 20 of the GPS unit 14 stamps the first time Tc relating to the photographing time on the image P, and the photographing memory portion 21 stores the image P. For example, in FIG. 3, a first time Tc1 is stamped on an image P1 taken in a first photographing operation. Another first time Tc2 is stamped on an image P2 taken in a second photographing operation. Another first time Tcn is stamped on an image Pn taken in an $n^{th}$ photographing operation.

On the other hand, the surveying device 3 tracks the movable photographing device 2, and determines a position of the camera 11 by a predetermined surveying period $\Delta T$. Note that the surveying period $\Delta T$ is a shorter period (a high frequency) than the photographing period $\Delta S$. For example, a survey is conducted by the surveying period $\Delta T=20$ ms to 100 ms with respect to the photographing period $\Delta S=1$ s to 3 s. In FIG. 3, the surveying period $\Delta T$ is a tenth of the photographing period $\Delta S$ for the sake of convenience of illustration.

Then, in the surveying device 3, for every survey, a second time Tt corresponding to a surveying time of the survey result R (the slant distance, the horizontal angle, the vertical angle) is stamped, and stored in the survey memory portion 43.

For example, in FIG. 3, a second time Tt3 is stamped on a third survey result R3 counted from the start of tracking. Another second time Tt13 is stamped on a thirteenth survey result R13. Another second time Ttm is stamped on an $m^{th}$ survey result Rm.

After the movable photographing device 2 completes all the photographing operations, the photographing position analysis portion 50 of the analysis device 4 receives the image data each composed of the image P and the first time Tc stored in the photographing memory portion 21, and the survey data each composed of the survey result R and the second time Tt stored in the survey memory portion 43.

The photographing position analysis portion 50 extracts the survey result R containing the second time Tt matching the first time Tc stamped on the image P to associate the extracted survey result R with the photographing position of the image P to generate the data for photogrammetry.

For example, in FIG. 3, the first time Tc1 corresponding to the first image P1 matches the second time Tt3 corresponding to the survey result R3. Thus, the survey result R3 is associated with a photographing position of the image P1.

Note that, if the first time Tc does not match the second time Tt, a second time Tta immediately before the first time Tc and a second time Ttb immediately after the first time Tc are designated as second times matching the first time Tc. Then, an interpolation survey result Ri is calculated by interpolation of survey results Ra, Rb corresponding to the second times Tta, Ttb, respectively. Then, the interpolation survey result Ri can be associated.

As described above, in the survey system 1 of this embodiment, the movable photographing device 2 and the surveying device 3 include the first time stamping portion 20 and the second time stamping portion 42, respectively, each capable of stamping a time with the same accuracy. The first time stamping portion 20 stamps the first time Tc on each image P taken by the camera 11. The second time stamping portion 42 stamps a second time Tt on each survey result R obtained by the surveying device 3. Then, in the analysis device 4, the survey result R on which the second time Tt matching the first time Tc of each image P was stamped is associated so that the survey result R precisely surveyed by the surveying device 3 is associated with a photographing position of the image P. Then, the data for photogrammetry can be generated. Accordingly, an exact photographing position is identified, and a more accurate photogrammetry can be achieved.

In particular, the first time stamping portion 20 and the second time stamping portion 42 each include a clock measuring time based on the GPS signal to securely and precisely stamp the first time Tc and the second time Tt, respectively. Thus, the survey system of this embodiment can be used in the world.

The descriptions of one embodiment of the present invention is now ended. However, the aspect of the present invention is not limited to this embodiment.

For example, in the embodiment described above, the surveying device 3 conducts surveys by the predetermined surveying period ΔT to obtain the survey results R, and the survey memory portion 43 stores all the survey results R obtained. To store a less amount of information, the survey memory portion 43 may store only necessary ones of the survey results R extracted during a photographing operation of the movable photographing device 2.

Figure 4:
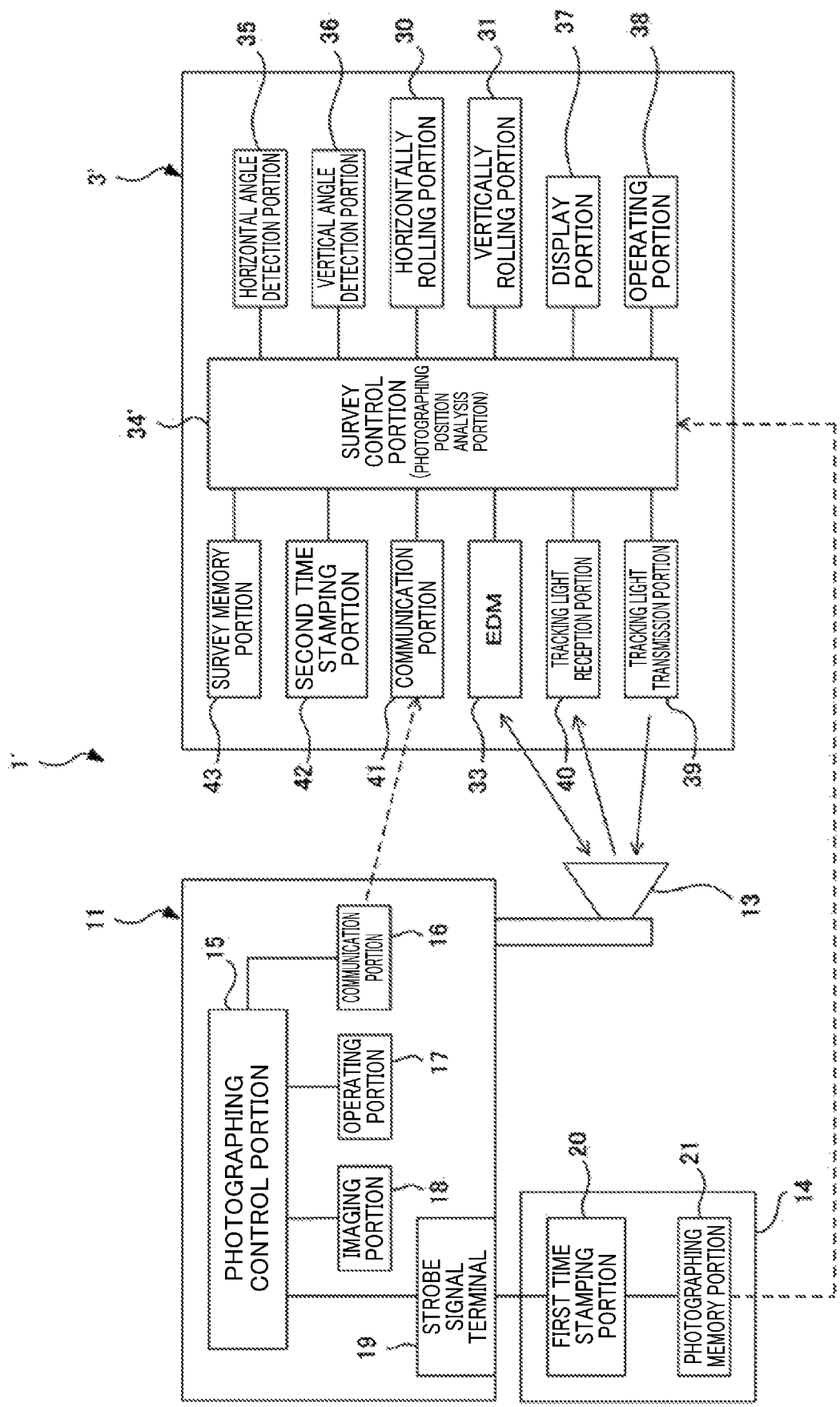
FIG. 4 is a control block diagram of a survey system of a variation of the present disclosure.
Figure 5:
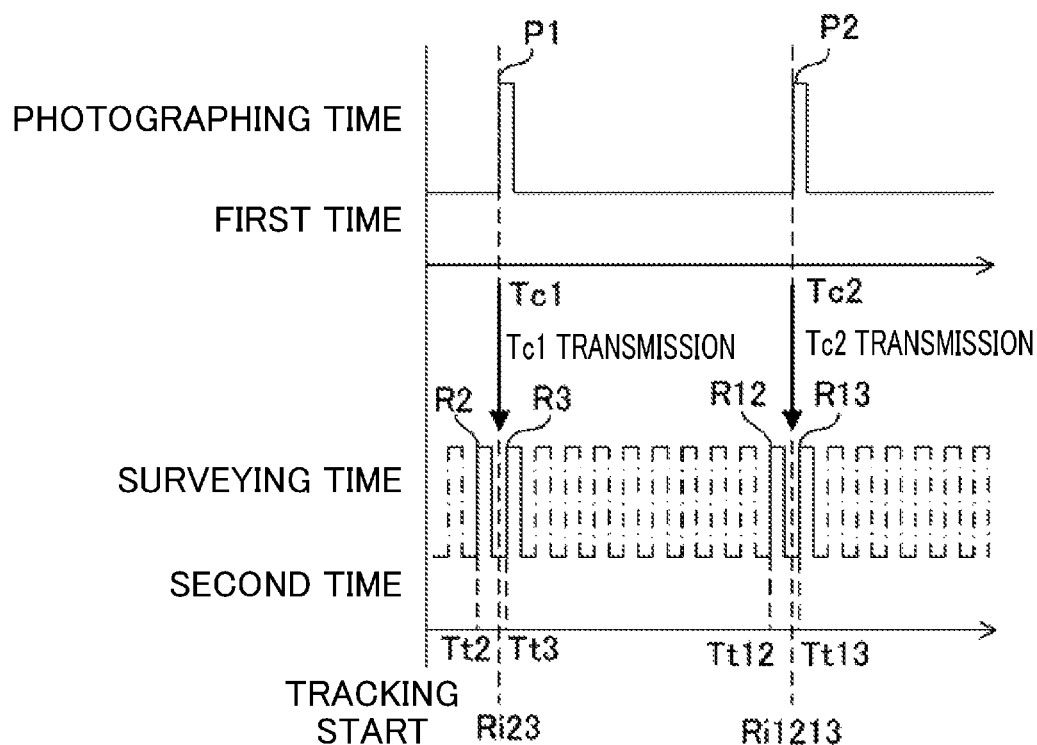
FIG. 5 is a time chart of photographing and surveying conducted by the survey system of the variation.

Specifically, a variation of the embodiment will be described with reference to FIGS. 4 and 5. FIG. 4 is a control block diagram of a survey system of the variation. FIG. 5 is a time chart of photographing and surveying conducted by the survey system of the variation. The variation will be described below with reference to the drawing. Note that the same configurations as those of the embodiment described above are labeled with the same reference characters. The detailed descriptions thereof will be omitted.

In a survey system 1' of the variation, a surveying device 3' includes a survey control portion 34' that also has a function of the photographing position analysis portion 50 of the embodiment described above. In the survey system 1', the information about a first time Tc stamped on a taken image P is sent to the surveying device 3' through a communication portion 16 of a camera 11 and a communication portion 41 of the surveying device 3' every time the camera 11 takes a photograph.

Specifically, for example, as illustrated FIG. 5, when a first time Tc1 is stamped on an image P1 taken in a first photographing operation, the information about the first time Tc1 is simultaneously sent to the surveying device 3'. Similarly, in a second photographing operation, a first time Tc2 relating to an image P2 is sent to the surveying device 3'. This also applies to a third and later photographing operations.

The surveying device 3' conducts a survey by a predetermined surveying period ΔT, and the survey control portion 34' makes the survey memory portion 43 temporarily store the survey result R thereof. When the surveying device 3' receives the information about the first time Tc, the survey control portion 34' makes the survey memory portion 43 hold only the survey result R containing a stamp of a second time Tt matching the first time Tc.

For example, in FIG. 5, suppose that the photographing time does not match the surveying time. Then, when the surveying device 3' receives a first time Tc1 relating to a first image P1, the survey memory portion 43 holds survey results R2, R3 corresponding to a second time Tt2 immediately before the first time Tc1 and a second time Tt3 immediately after the first time Tc1, respectively. In other words, the survey control portion 34' makes the survey memory portion 43 delete the survey result R1 obtained before the survey results R2, R3 corresponding to the second times Tt2, Tt3.

Similarly, when a first time Tc2 is stamped on an image P2 taken in a second photographing operation, the information about the first time Tc2 is simultaneously sent to the surveying device 3'. Then, the survey control portion 34' makes the survey memory portion 43 hold the survey results R12, R13 containing second times Tt12, Tt13 matching the first time Tc2. The survey control portion 34' also makes the survey memory portion 43 delete survey results R4 to R11 containing second times Tt4 to Tt11 not matching the first time Tc. This also applies to a third and later photographing operations.

Then, during photographing operations or after all the photographing operations conducted by the movable photographing device 2, the survey control portion 34' calculates interpolation survey results Ri23, Ri1213 through interpolation of the survey results R2, R3, R12, R13, to associate the interpolation survey results Ri23, Ri1213 with the images P1, P2 to obtain the data for photogrammetry.

In particular, if associating the survey result R with the image P during a photographing operation conducted by the movable photographing device, the survey control portion 34' may make the display portion 37 display the generated data for photogrammetry. Accordingly, an exact position of the movable photographing device 2 can be checked during a photographing operation conducted by the movable photographing device 2, and also the flight plan can be confirmed or revised during a photographing operation conducted by the movable flight of photographing device 2 in flight.

As described above, in the survey system 1' of the variation, the survey memory portion 43 holds only the survey result R matching the first time Tc stamped on the image P. Thus, in the surveying device 3', unnecessary survey results R can be reduced, and the data can be output without redundancy.

In the embodiment and variation described above, the movable photographing device 2 is composed of the UAV 10 as a movable body. However, the movable body is not limited thereto, and may be a movable body moving on the ground, such as a vehicle or a human.

In the embodiment described above, the camera 11 is connected with the GPS unit 14 through the strobe signal terminal 19. However, the camera may internally include the GPS unit.

In the embodiment described above, the first time stamping portion 20 and the second time stamping portion 42 use the respective clocks measuring time based on the GPS signals to stamp the first time Tc and the second time Tt, respectively. However, the clocks used by the first and second time stamping portions only have to be capable of measuring time with the same accuracy, and may be, e.g., so-called radio clocks capable of receiving standard radio waves to correct a time difference.

Suppose that, due to influence by a surrounding building or reduction in the number of satellites observed, the GPS signal is temporarily blocked from the first and second time stamping portions. In this case, a CPU clocking means (e.g., a timer counter composed of a crystal oscillator) contained in the photographing control portion, the survey control portion, the first time stamping portion, or the second time stamping portion may be complementary to measurement of the first time and the second time.

Figure 6:
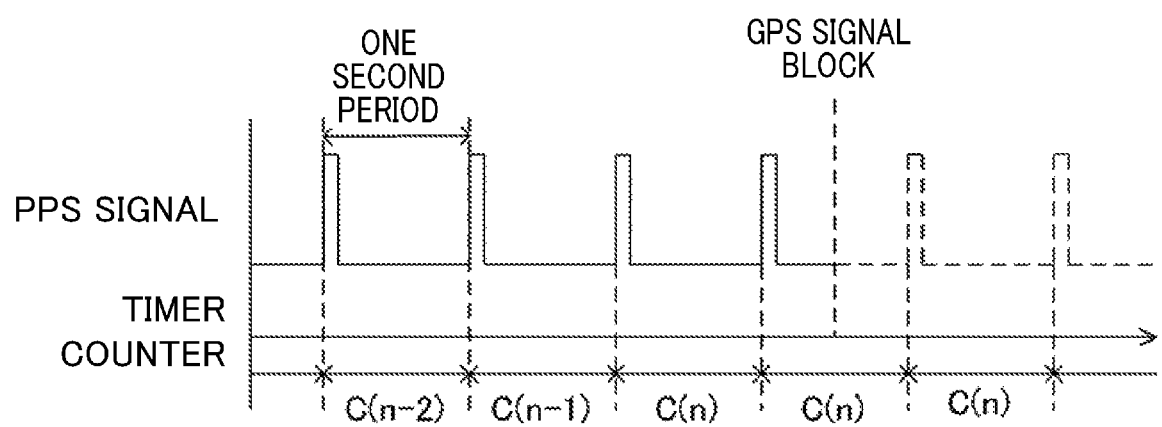
FIG. 6 shows an example of time measurement in a case where a GPS signal is blocked.

Note that the CPU timer counter might be slightly affected by, e.g., a temperature. Thus, for example, as illustrated in FIG. 6, a PPS signal of one second period is preferably measured and studied by the CPU timer counter so that, if the GPS signal is blocked, the latest counter time C(n) is used to measure the first time and the second time. In other words, even in the case of failure in receiving the GPS signals, the PPS signal is considered to be received at the time when the CPU timer counter shows that the counter time C(n) has passed. Then, the time is measured.

Thus, even if the GPS signal cannot be temporarily received, the first time and the second time can be stamped accurately, and the accuracy of photogrammetry can be maintained.

What is claimed is:

1. A survey system comprising:
   a movable photographing device including
      a movable body,
      a photographing portion taking a plurality of images for photogrammetry,
      a first time stamping portion receiving a global positioning system (GPS) signal containing time information from a GPS satellite and stamping a GPS time based on the GPS signal as a first time relating to a photographing time on the plurality of images taken by the photographing portion, and
      a photographing memory portion storing the plurality of images on which the first time is stamped;
   a surveying device including
      a surveying portion including an electro-optical distance meter, a horizontal angle detection portion, and a vertical angle detection portion, the surveying portion automatically tracking the movable photographing device, and determining a position of the movable photographing device,
      a second time stamping portion receiving a GPS signal containing time information from a GPS satellite and stamping a GPS time based on the GPS signal as a second time relating to a surveying time on a survey result obtained by the surveying portion, the survey result including a slant distance, a horizontal angle, and a vertical angle with respect to the movable photographing device, and
      a survey memory portion storing the survey result on which the second time is stamped; and
   a photographing position analysis portion
      associating, based on the first time and the second time, a photographing position of the movable photographing device calculated from the survey result with a photographing position of each of the plurality of images taken by the movable photographing device, and
      generating data for photogrammetry.

2. The survey system of claim 1, wherein
   the surveying portion of the surveying device
      determines the position of the movable photographing device by a predetermined surveying period shorter than an interval between photographing operations conducted by the photographing portion; and
   after the movable photographing device completes all the photographing operations, the photographing position analysis portion
      obtains, from the movable photographing device, each of the plurality of images on which the first time is stamped, and
      obtains, from the surveying device, each survey result on which the second time is stamped,
      associates the survey result on which the second time matching the first time is stamped with the respective image, and
      generating data for photogrammetry.

3. The survey system of claim 1, wherein
   the movable photographing device
      includes a communication portion capable of communicating with the surveying device, and
      sends information about the first time stamped on an image through the communication portion every time the photographing portion conducts a photographing operation; and
   the surveying portion of the surveying device
      determines the position of the movable photographing device by a predetermined surveying period shorter than an interval between photographing operations conducted by the photographing portion,
      receives the information about the first time, and
      holds only a survey result on which the second time matching the first time is stamped.

* * * * *